US011989120B2

(12) United States Patent
Rishea et al.

(10) Patent No.: US 11,989,120 B2
(45) Date of Patent: May 21, 2024

(54) VISUAL TESTING ISSUE REPRODUCTION BASED ON COMMUNICATION OF AUTOMATED WORKFLOW

(71) Applicant: DISH Network L.L.C., Englewood, CO (US)

(72) Inventors: John Vincent Rishea, Centennial, CO (US); Andrew Fakhry, Englewood, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 17/329,933

(22) Filed: May 25, 2021

(65) Prior Publication Data
US 2022/0382667 A1 Dec. 1, 2022

(51) Int. Cl.
*G06F 11/36* (2006.01)
*G06N 20/00* (2019.01)

(52) U.S. Cl.
CPC ...... *G06F 11/3688* (2013.01); *G06F 11/3664* (2013.01); *G06F 11/3684* (2013.01); *G06N 20/00* (2019.01)

(58) Field of Classification Search
CPC ............. G06F 11/3688; G06F 11/3664; G06F 11/3684; G06F 20/00; G06N 20/00
See application file for complete search history.

(56) References Cited

U.S. PATENT DOCUMENTS

| | | | | |
|---|---|---|---|---|
| 6,708,324 | B1 * | 3/2004 | Solloway | G06F 11/3688 717/124 |
| 6,775,824 | B1 * | 8/2004 | Osborne, II | G06F 11/3664 717/125 |
| 6,993,747 | B1 * | 1/2006 | Friedman | G06F 11/36 717/124 |
| 7,000,224 | B1 * | 2/2006 | Osborne, II | G06F 11/3688 717/125 |
| 7,228,524 | B2 * | 6/2007 | Bailey | G06F 11/3696 717/124 |
| 7,313,564 | B2 * | 12/2007 | Melamed | G06F 11/3684 717/124 |
| 8,020,044 | B2 * | 9/2011 | Martinov | G06F 11/3688 714/25 |
| 8,086,902 | B2 | 12/2011 | Rashevsky et al. | |
| 8,195,983 | B2 * | 6/2012 | Celeskey | G06F 11/3688 714/37 |
| 8,856,594 | B2 * | 10/2014 | Kurapati | G06F 11/3672 714/27 |
| 9,003,368 | B2 * | 4/2015 | Kim | G06F 11/3684 717/124 |

(Continued)

FOREIGN PATENT DOCUMENTS

EP 3273689 A1 1/2018
JP 2008206042 A 9/2008

*Primary Examiner* — Douglas M Slachta
(74) *Attorney, Agent, or Firm* — Seed IP Law Group LLP (57) ABSTRACT

An example method for visual testing and issue communication of programmed display of content includes obtaining a workflow of test scenarios for visual testing a display. The content displayed on the display is controlled by a set-top box (STB) device executing target instructions. The example method further includes identifying a visual testing issue associated with executing the test scenarios, and communicating the workflow and issue to a remote device for reproduction of the issue.

20 Claims, 5 Drawing Sheets

(56) References Cited

U.S. PATENT DOCUMENTS

| | | | |
|---|---|---|---|
| 9,032,373 B1* | 5/2015 | Gupta | G06F 11/3688 |
| | | | 717/127 |
| 9,135,146 B1* | 9/2015 | Allen | G06F 11/0706 |
| 9,378,120 B2* | 6/2016 | Chakraborty | G06F 11/3688 |
| 9,430,359 B1* | 8/2016 | Troutman | G06F 11/366 |
| 9,510,044 B1 | 11/2016 | Pereira et al. | |
| 9,600,401 B1* | 3/2017 | Haischt | G06F 11/3688 |
| 9,774,912 B2* | 9/2017 | Friel | H04H 60/32 |
| 10,291,959 B2 | 5/2019 | Kumar et al. | |
| 10,528,691 B1 | 1/2020 | Ovadia | |
| 10,574,980 B1 | 2/2020 | Batiz et al. | |
| 11,521,400 B2 | 12/2022 | Chhabra et al. | |
| 2006/0010426 A1* | 1/2006 | Lewis | G06F 11/3684 |
| | | | 717/124 |
| 2006/0075303 A1* | 4/2006 | Ulrich | G06F 11/3672 |
| | | | 714/38.14 |
| 2006/0195860 A1 | 8/2006 | Eldering et al. | |
| 2007/0094542 A1* | 4/2007 | Bartucca | G06F 11/3688 |
| | | | 714/38.1 |
| 2007/0157274 A1 | 7/2007 | Chiu | |
| 2007/0277158 A1* | 11/2007 | Li | G06F 11/3684 |
| | | | 717/135 |
| 2008/0127097 A1* | 5/2008 | Zhao | G06F 11/3684 |
| | | | 717/124 |
| 2008/0256394 A1 | 10/2008 | Rashevsky et al. | |
| 2009/0133000 A1* | 5/2009 | Sweis | G06F 11/3688 |
| | | | 717/124 |
| 2009/0178021 A1* | 7/2009 | Alluri | G06F 11/3684 |
| | | | 717/104 |
| 2010/0324855 A1* | 12/2010 | Parker | G06F 11/2294 |
| | | | 715/700 |
| 2011/0276946 A1* | 11/2011 | Pletter | G06F 11/3688 |
| | | | 717/124 |
| 2011/0289354 A1* | 11/2011 | Martinov | G06F 11/3688 |
| | | | 714/E11.178 |
| 2011/0307864 A1* | 12/2011 | Grechanik | G06F 11/3696 |
| | | | 717/124 |
| 2012/0023485 A1* | 1/2012 | Dubey | G06F 8/30 |
| | | | 717/125 |
| 2012/0110591 A1* | 5/2012 | Ghosh | G06F 11/3604 |
| | | | 718/104 |
| 2012/0226462 A1 | 9/2012 | Rucker | |
| 2013/0007522 A1* | 1/2013 | Kurapati | G06F 11/3688 |
| | | | 714/E11.178 |
| 2013/0159784 A1* | 6/2013 | Rossi | G06F 11/3684 |
| | | | 714/47.1 |
| 2014/0325487 A1* | 10/2014 | Maczuba | G06F 11/3636 |
| | | | 717/128 |
| 2015/0070587 A1 | 3/2015 | Emeott et al. | |
| 2015/0212927 A1* | 7/2015 | N'Gum | G06F 11/368 |
| | | | 717/125 |
| 2016/0378647 A1* | 12/2016 | Maeoka | G06F 11/3688 |
| | | | 717/124 |
| 2017/0147480 A1* | 5/2017 | Lachwani | G06F 11/3664 |
| 2017/0286805 A1 | 10/2017 | Yu et al. | |
| 2018/0307583 A1* | 10/2018 | Yang | G06F 11/368 |
| 2019/0045203 A1 | 2/2019 | Varadarajan et al. | |
| 2019/0163612 A1* | 5/2019 | Michalski | G06F 11/3688 |
| 2019/0243752 A1* | 8/2019 | Bakshi | G06F 11/3688 |
| 2020/0249964 A1* | 8/2020 | Fernandes | G06F 9/451 |
| 2021/0014565 A1 | 1/2021 | Zamudio et al. | |
| 2021/0216442 A1* | 7/2021 | Bhadani | G06F 11/3684 |
| 2021/0397546 A1* | 12/2021 | Cser | G06K 9/6296 |
| 2022/0100647 A1* | 3/2022 | Hamid | G06F 11/323 |
| 2022/0116680 A1 | 4/2022 | Fakhry | |
| 2022/0382667 A1 | 12/2022 | Rishea et al. | |

* cited by examiner

VISUAL TESTING ISSUE REPRODUCTION BASED ON COMMUNICATION OF AUTOMATED WORKFLOW

BACKGROUND

Technical Field

The present disclosure relates to visual testing of content presentation, and in particular to issue reproduction associated with visual testing of the functionality of a software or application.

Description of the Related Art

Content distribution platforms, such as satellite television service providers and cable television service providers, interact with large numbers of hardware devices associated with their respective consumer subscribers. As one example, a platform may provide multimedia programming to hundreds of thousands, or even millions, of set-top boxes ("STBs" or "STB devices").

Black box visual testing independent of the underlying design or code executing on the STBs is an important step to verify the integrity of their functionality. Typical black box testing relies heavily on manual tagging and description of displayed features by testers, thus can be a lengthy and repetitive process that goes back and forth between developers and testers. Additionally, the discrepancy between a tester's description and the actual occurrence of an issue makes it difficult or even impossible to reproduce issues by another tester or developer. The problem is exacerbated by the variety of styles and inconsistency of reporting by different testers. Thus, there remains a need for more efficient and effective visual testing and issue communication technologies.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the environment, have not been shown or described in order to avoid unnecessarily obscuring descriptions of the embodiments. Additionally, the various embodiments may be methods, systems, media, or devices. Accordingly, the various embodiments may combine software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances.

References to the term "subset" (e.g., "a subset of the set of items"), as used herein, unless otherwise noted or contradicted by context, is to be construed as a nonempty collection comprising one or more members or instances of a set or plurality of members or instances.

Moreover, the term "subset," as used herein, refers to a proper subset, which is a collection of one or more members or instances that are collectively smaller in number than the set or plurality of which the subset is comprised. For instance, a subset of a set of ten items will have less than ten items and at least one item.

The presently disclosed technology enables a user (e.g., a tester, developer, or third party) to prepare one or more test scenarios, and integrate them in one or more workflows for automated execution, communication, and sharing, during or after the development of hardware or software. A workflow can be executed on different devices or systems to efficiently and consistently replicate a bug, anomaly, or other issues that occurred in connection with certain test scenario of the workflow, so that other user(s) can perceive, comprehend, and resolve the issue without the drawbacks associated with typical black box testing. In some embodiments, the presently disclosed technology uses trained machine learning model(s) to detect screen elements with high efficiency and consistency in testing results, which further improves the adaptability to and compatibility among different testing targets.

In certain embodiments of the presently disclosed technology, a first visual testing server obtains a workflow of test scenarios for visual testing of an STB controlled display (e.g., TV, monitor, projector, or the like). A test scenario can be represented by logical expression(s) that specify condition(s), action(s), expectation(s), or the like. The first visual testing server communicates (e.g., via Representational State Transfer Application Programming Interfaces (REST APIs)) with the STB under testing when the specified condition (e.g., the STB is warmed up and running) is satisfied, to perform or simulate action(s) applicable to the STB (e.g., remote control key press), and then obtains (e.g., by requesting screenshots via a server or application running on the STB) image(s) that capture content displayed on the STB display in response.

Based on the image(s), the first visual testing server can identify and locate display elements, and perform visual testing by comparing various information about the detected display elements with one or more visual expectations specified by the test scenario. The first visual testing server can determine the classification, location, size, color, or content of detected display elements, as well as confidence values associated therewith. The visual expectations can indicate expected location of a display element relative to at least another display element, expected location of a display element relative to the STB display, expected range of display element location, or expected distance between at least two display elements. The visual expectations can indicate expected size of a display element relative to at least another display element, expected size of a display element relative to the STB display, or expected range of display element size. Depending on the outcome of the testing (e.g., using thresholds applicable to the associated confidence values), the first visual testing server can proceed to another test scenario selected from the workflow (e.g., in a temporally sequential, concurrent, or partially overlapping manner), or identify bugs, anomalies, or other visual testing issues and associate them with corresponding test scenarios (e.g., by flagging or labeling related image(s)). In some embodiments, user(s) of the first visual testing server (e.g., via connected user device(s)) can intervene or otherwise perform at least some part of the issue identification process.

In some embodiments, the first visual testing server monitors, records, or otherwise obtains data of a user's interaction with the STB under testing. The first visual testing server can map or convert the user's interactions as well as corresponding content displayed by the STB-controlled display (and transitions thereof) to test scenarios, and integrate them into an automated workflow. If the user or the first visual testing server identifies issues during the interactions, the issues can similarly be associated with corresponding test scenarios.

The workflows with identified issues can be communicated or otherwise shared with a second visual testing server, which can execute the workflows to replicate identified issues with another STB or compatible device associated with the second visual testing server. Other user(s) of the second visual testing server can view or otherwise perceive the replication of the issue(s) and resolve them by working with the other STB or compatible device.

In various embodiments, the presently disclosed technology may provide various functionality to enable presentation of one or more aspects of workflow obtaining, workflow processing, display element detection, issue identification, workflow communication, issue reproduction, or the like. As non-limiting examples, in various embodiments such functionality may include one or more of the following: providing a user interface—such as a command-line query interface, a GUI, or application program interface (API)—to allow one or more users to interact with the visual testing server(s).

Figure 1:
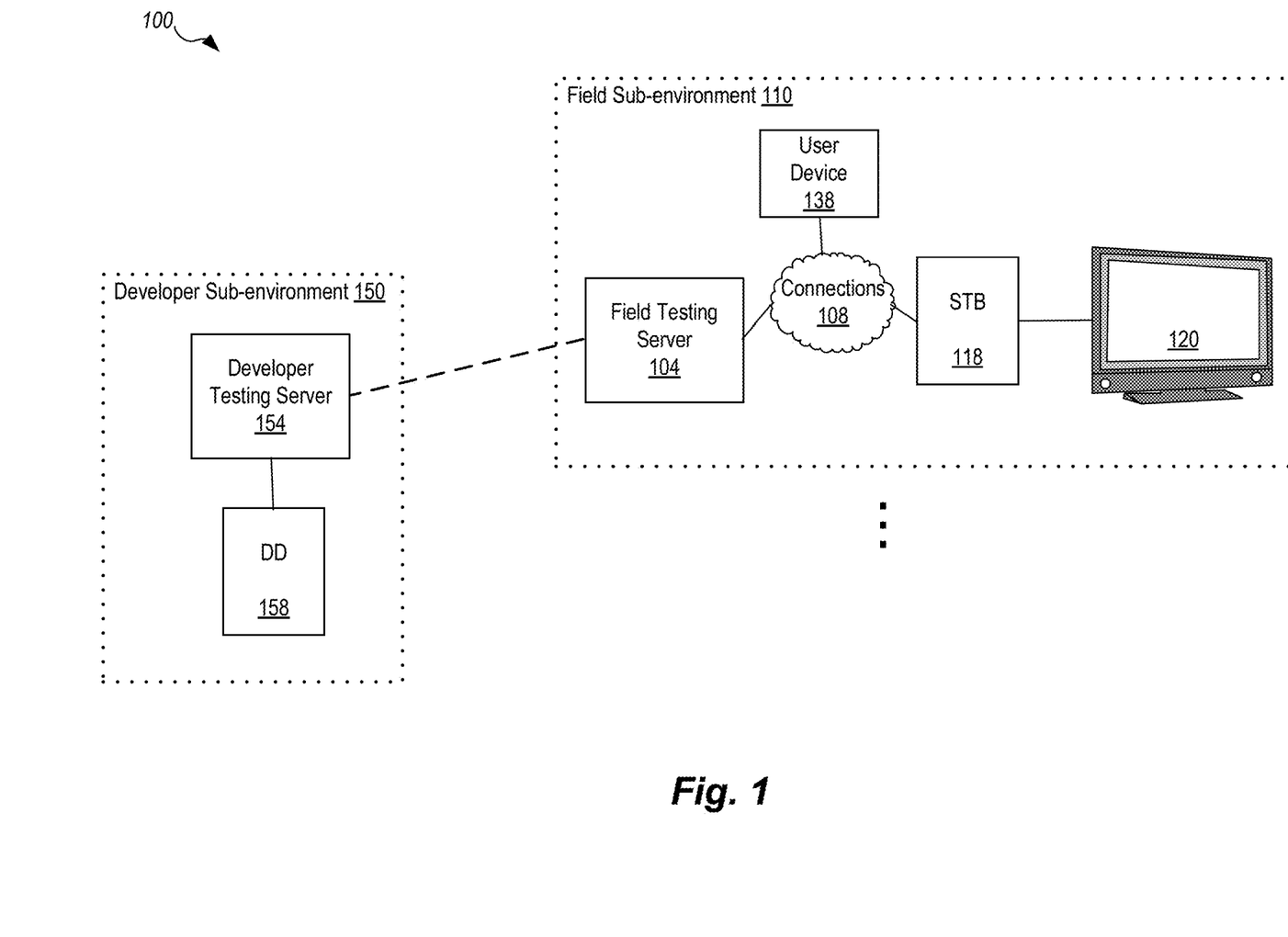
FIG. 1 is an overview block diagram illustrating an exemplary networked environment for visual testing and issue communication in accordance with some embodiments of the techniques described herein.

FIG. 1 is an overview block diagram illustrating an exemplary networked environment 100 for visual testing and issue communication in accordance with some embodiments of the techniques described herein. The environment 100 includes at least one field sub-environment 110 and at least one developer sub-environment 150. The field sub-environment 110 includes at least one field testing server 104, at least one STB device 118 and associated display device 120, and at least one user device 138, which are interconnected with one another via at least some part of connections 108. The developer sub-environment 150 includes at least one developer testing server 154 connected with at least one developer device 158. It will be appreciated that in various scenarios and embodiments, multiple entities or functional equivalents may be communicatively connected with other entities of environment 100.

In various embodiments, examples of an STB device 118 or developer device 158 include, but are not limited to, one or a combination of the following: a "television converter," "receiver," "set-top box," "television receiving device," "television receiver," "television," "television recording device," "satellite set-top box," "satellite receiver," "cable set-top box," "cable receiver," "media player," "digital video recorder (DVR)," "digital versatile disk (DVD) Player," "computer," "mobile device," "tablet computer," "smart phone," "MP3 Player," "handheld computer," and/or "television tuner," etc. Accordingly, the STB device 118 may be any suitable converter device or electronic equipment that is, e.g., operable to receive programming via a connection to a satellite or cable television service provider and communicate that programming to another device over a network. Further, the STB device 118 may itself include user interface devices, such as buttons or switches. The developer device 158 can be an STB device, a functional equivalent device, or a compatible device (e.g., a developer box of STB suitable for debugging or reprogramming).

In various embodiments, examples of a display device 120 may include, but are not limited to, one or a combination of the following: a television ("TV"), a projector, a monitor, a personal computer ("PC"), a sound system receiver, a digital video recorder ("DVR"), a compact disk ("CD") device, DVD Player, game system, tablet device, smart phone, mobile device or other computing device or media player, and the like. Each of the display devices 120 typically employs a display, one or more speakers, or other output devices to present at least image(s), video, and/or audio to a user. In many implementations, one or more display devices 120 are communicatively coupled, directly or indirectly, to an STB device 118. Further, the STB device 118 and the display device(s) 120 may be integrated into a single device. Such a single device may have the above-described functionality of the STB device 118 and the display device 120, or may even have additional functionality. In the developer sub-environment 150, the developer device 158 can be connected or integrated with one or more display devices 120 (not shown).

In some embodiments, the STB device(s) 118 is configured to receive and decrypt content received according to various digital rights management and other access control technologies and architectures by executing computer codes or other executable instructions. Furthermore, in at least some embodiments, the STB device(s) 118 may include one or more APIs that provide programmatic access to add, remove, or change one or more functions of the STB device(s) 118. For example, such an API may provide a programmatic interface to one or more functions that may be invoked by any other program, a remote control, one or more content providers and/or program distributors, one or more information providers, a local and/or remote content storage system, or some other module. In this manner, the API may facilitate the development of third-party software, such as various different on-demand service applications, user interfaces, plug-ins, adapters (e.g., for integrating functions of the STB device 118 into desktop applications), and other functionality. In particular, one or more APIs (e.g., REST APIs) provide a programmatic interface to a server or application executing on the STB device 118 that communicates with the visual testing server 104 to perform visual testing of STB native functions or third-party software, independent of their executable code or instructions.

In the depicted exemplary networked environment 100, the connections 108 may comprise one or more computer networks, one or more wired or wireless networks, satellite transmission media, one or more cellular networks, or some combination thereof. The connections 108 may include a publicly accessible network of linked networks, possibly operated by various distinct parties, such as the Internet. The connections 108 may include other network types, such as one or more private networks (e.g., corporate or university networks that are wholly or partially inaccessible to non-privileged users), and may include combinations thereof, such that (for example) one or more of the private networks have access to and/or from one or more of the public networks. Furthermore, the connections 108 may include various types of wired and/or wireless networks in various situations, including satellite transmission. In addition, the connections 108 may include one or more communication interfaces to individual entities in the networked environment 100, various other mobile devices, computing devices and media devices, including but not limited to, radio frequency (RF) transceivers, cellular communication interfaces and antennas, USB interfaces, ports and connections (e.g., USB Type-A, USB Type-B, USB Type-C (or USB-C), USB mini A, USB mini B, USB micro A, USB micro C), other RF transceivers (e.g., infrared transceivers, Zigbee® network connection interfaces based on the IEEE 802.15.4 specification, Z-Wave® connection interfaces, wireless Ethernet ("Wi-Fi") interfaces, short range wireless (e.g., Bluetooth®) interfaces and the like.

In various embodiments, examples of a user device 138 include, but are not limited to, one or a combination of the following: a "computer," "mobile device," "tablet computer," "smart phone," "handheld computer," and/or "workstation," etc. The user device(s) 138 may be any suitable computing device or electronic equipment that is, e.g., operable to communicate with the visual testing server 104 and to interact with user(s) for obtaining and processing test scenario(s) or workflow(s) as well as presenting visual testing progress(es) or result(s). In the developer sub-environment 150, the developer testing server 154 or the developer device 158 can be connected with one or more such user devices (not shown).

In various embodiments, the field testing server 104 and the developer testing server 154 can be implemented in software and/or hardware form on one or more computing devices including a "computer," "mobile device," "tablet computer," "smart phone," "handheld computer," and/or "workstation," etc. An example of the field testing server 104 or the developer testing server 154 is a visual testing server described in U.S. patent application Ser. No. 17/070,186 filed Oct. 14, 2020, titled "VISUAL TESTING BASED ON MACHINE LEARNING AND AUTOMATED WORKFLOW." In some embodiments, the developer testing server 154 includes different or additional functionalities than the field testing server 104, e.g., to control or communicate with the developer device 158 for debugging or reprogramming. The field testing server 104 is communicatively connected with the developer testing server 154, e.g., via at least a part of connections 108 or other connections.

Data communications among entities of the networked environment 100 can be encrypted. Related encryption and decryption may be performed as applicable according to one or more of any number of currently available or subsequently developed encryption methods, processes, standards, protocols, and/or algorithms, including but not limited to: encryption processes utilizing a public-key infrastructure (PKI), encryption processes utilizing digital certificates, the Data Encryption Standard (DES), the Advanced Encryption Standard (AES 128, AES 192, AES 256, etc.), the Common Scrambling Algorithm (CSA), encryption algorithms supporting Transport Layer Security 1.0, 1.1, and/or 1.2, encryption algorithms supporting the Extended Validation (EV) Certificate, etc.

The above description of the exemplary networked environment 100 and the various service providers, systems, networks, and devices therein is intended as a broad, non-limiting overview of an exemplary environment in which various embodiments of the facility may be implemented. FIG. 1 illustrates just one example of an operating environment, and the various embodiments discussed herein are not limited to such environments. In particular, the networked environment 100 may contain other devices, systems and/or media not specifically described herein.

Figure 2:
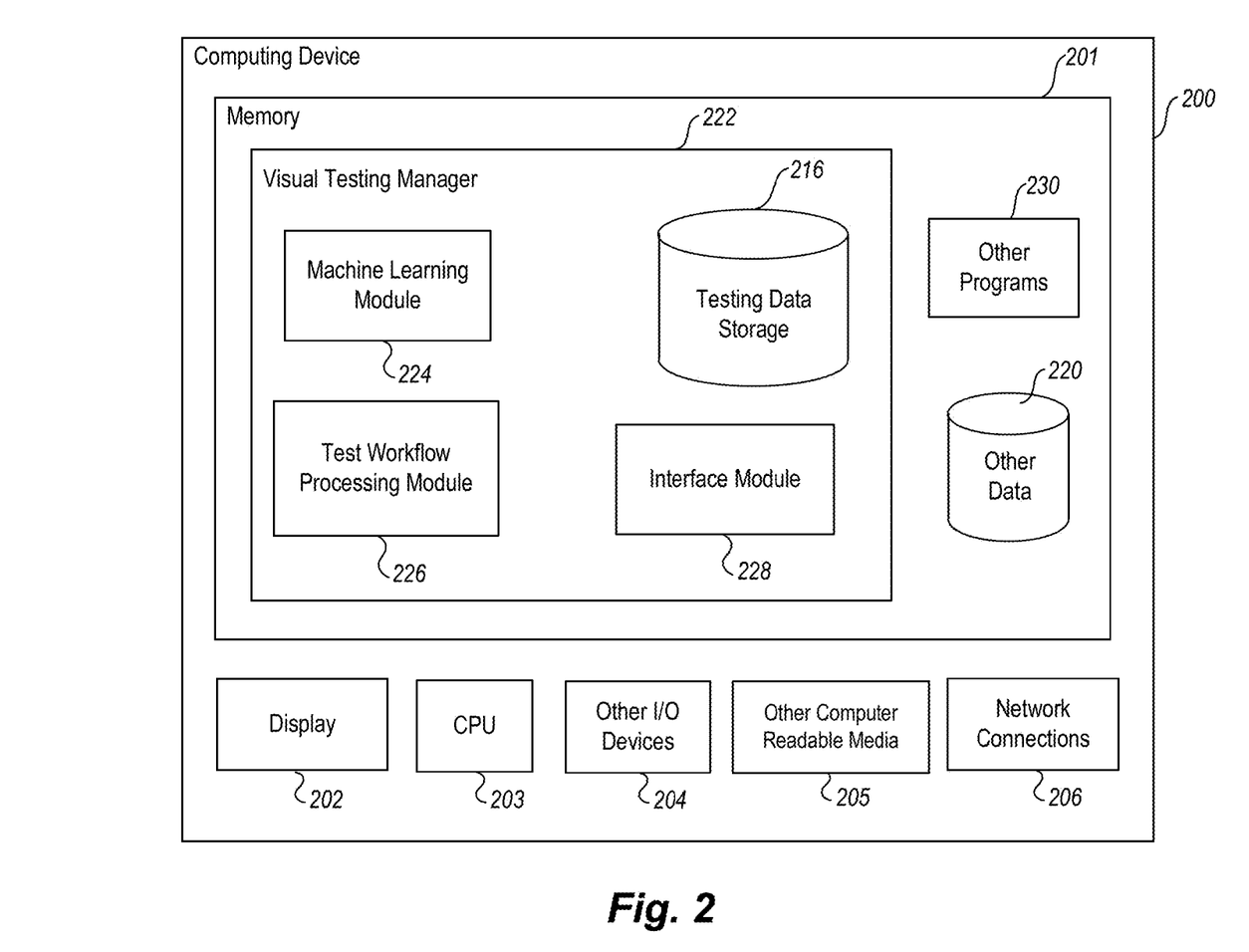
FIG. 2 is a block diagram illustrating elements of an exemplary computing device that is suitable for performing at least some of the techniques described herein, according to some embodiments.

FIG. 2 is a block diagram illustrating elements of an exemplary computing device 200 (e.g., corresponding to a field testing server 104 or developer testing server 154, or at least a part thereof) that is suitable for performing at least some of the techniques described herein, according to some embodiments.

In some embodiments, one or more general purpose or special purpose computing systems or devices may be used to implement the computing device 200. In addition, in some embodiments, the computing device 200 may comprise one or more distinct computing systems or devices, and may span distributed locations. Furthermore, each block shown in FIG. 2 may represent one or more such blocks as appropriate to a specific embodiment or may be combined with other blocks. Also, the visual testing manager 222 may be implemented in software, hardware, firmware, or in some combination to achieve the capabilities described herein.

In the embodiment shown, the computing device 200 comprises a computer memory ("memory") 201, a display 202 (including, but not limited to a light emitting diode (LED) panel, cathode ray tube (CRT) display, liquid crystal display (LCD), touch screen display, projector, etc.), one or more Central Processing Units ("CPU") 203, Input/Output ("I/O") devices 204 (e.g., keyboard, mouse, RF or infrared receiver, universal serial bus (USB) ports, High-Definition Multimedia Interface (HDMI) ports, other communication ports, and the like), other computer-readable media 205, and network connections 206. The visual testing manager 222 is shown residing in memory 201. In other embodiments, some portion of the contents and some, or all, of the components of the visual testing manager 222 may be stored on and/or transmitted over the other computer-readable media 205. The components of the computing device 200 and visual testing manager 222 can execute on one or more CPUs 203 and implement the creating, processing, and communicating of test scenario(s) and test workflow(s), detecting display elements based on machine learning model(s), or other functions described herein. In some embodiments, the visual testing manager 222 may operate as, be part of, or work in conjunction and/or cooperation with other software applications stored in memory 201 or on various other computing devices. In some embodiments, the visual testing manager 222 also facilitates communication with peripheral devices such as a remote control, via the I/O devices 204, or with another device or system (e.g., an STB or developer device) via the network connections 206.

The machine learning module 224 is configured to perform actions related to machine learning-based display element processing. In some embodiments, the machine learning module 224 is configured to perform model selection, model training, model validation, model deployment, model error detection, model updating, model-based display element detection, combinations of the same or the like. In some embodiments, the machine learning module 224 stores, retrieves, or otherwise accesses at least some model-related data on some portion of the testing data storage 216 or other data storage internal or external to the computing device 200.

The test workflow processing module 226 is configured to perform actions related to test scenario and test workflow. In some embodiments, the test workflow processing module 226 is configured to perform tester behavior monitoring or recording, test scenario conversion or in-taking, test workflow creation or integration, test scenario/workflow parsing, causing and controlling communication with device(s) under testing, obtaining image/video used for visual testing, combination of the same or the like. In some embodiments, the test workflow module 226 stores, retrieves, or otherwise accesses at least some test-related data on some portion of the testing data storage 216 or other data storage internal or external to the computing device 200.

The interface module 228 is configured to perform actions related to facilitating interactions with user device(s) 138 or other testing server(s). In some embodiments, the interface module 228 is configured to perform GUI generation, GUI processing, user input processing, communication or presentation of test process and result, combination of the same or the like. In some embodiments, the interface module 228 stores, retrieves, or otherwise accesses at least some user interface-related data on some portion of the testing data storage 216 or other data storage internal or external to the computing device 200.

Other code or programs 230 (e.g., further audio/video processing modules, a program guide manager module, a Web server, and the like), and potentially other data repositories, such as data repository 220 for storing other data (user profiles, preferences and configuration data, etc.), may also reside in the memory 201, and can execute on one or more CPUs 203. Of note, one or more of the components in FIG. 2 may or may not be present in any specific implementation. For example, some embodiments may not provide other computer readable media 205 or a display 202.

In some embodiments, the computing device 200 and manager 222 include API(s) that provides programmatic access to add, remove, or change one or more functions of the computing device 200. One or more APIs (e.g., REST APIs) can provide programmatic interface to allow device(s) under testing, user device(s), or other testing server(s) to communicate with the computing device 200, for communicating workflows and reproducing bugs, anomalies, or other issues.

In some embodiments, components/modules of the computing device 200 and manager 222 are implemented using standard programming techniques. For example, the visual testing manager 222 may be implemented as an executable running on the CPU 203, along with one or more static or dynamic libraries. In other embodiments, the computing device 200 and manager 222 may be implemented as instructions processed by a virtual machine that executes as one of the other programs 230. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the computing device 200 to perform the functions of the visual testing manager 222. In some embodiments, instructions cause the CPU 203 or some other processor, such as an I/O controller/processor, to perform at least some functions described herein including, but are not limited to, test scenario processing, test workflow processing, machine learning based display item detection, test workflow communication, issue reproduction, or the like.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs or other processors. Some embodiments may execute concurrently and asynchronously, and communicate using message passing techniques. Equivalent synchronous embodiments are also supported by a visual testing manager 222 implementation. Also, other functions could be implemented and/or performed by each component/module, and in different orders, and by different components/modules, yet still achieve the functions of the computing device 200 and manager 222.

In addition, programming interfaces to the data stored as part of the computing device 200 and manager 222, can be available by standard mechanisms such as through C, C++, C#, and Java APIs; libraries for accessing files, databases, or other data repositories; scripting languages such as XML; or Web servers, FTP servers, NFS file servers, or other types of servers providing access to stored data. The testing data storage 216 and data repository 220 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the visual testing manager 222.

Furthermore, in some embodiments, some or all of the components of the computing device 200 and manager 222 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

Figure 3:
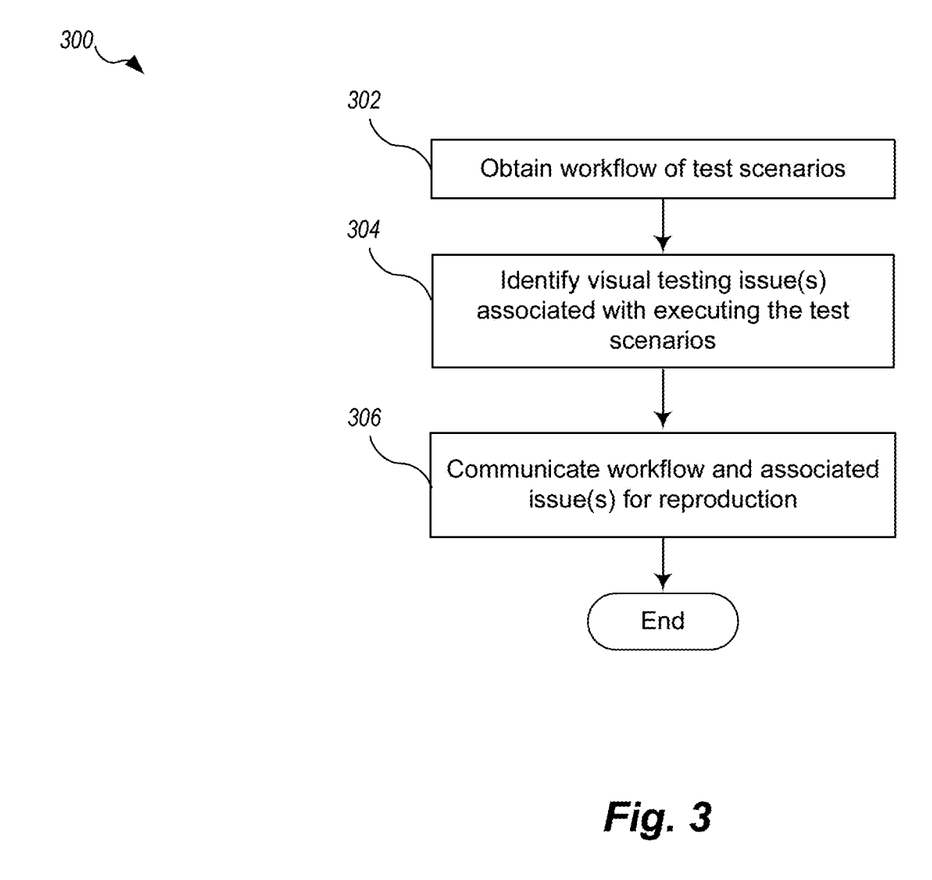
FIG. 3 is a flow diagram showing an exemplary process for identifying and communicating visual testing issues, according to some embodiments.

FIG. 3 is a flow diagram showing an exemplary process 300 for identifying and communicating visual testing issues, according to some embodiments. Illustratively, the process 300 is performed by the field testing server 104. In some embodiments, part of the process 300 is performed by STB device(s) 118, user device(s) 138, or the developer testing server 154.

The process 300 begins at block 302, which includes obtaining a workflow of test scenarios for visual testing of one or more target displays controlled or otherwise associated with STB device(s). For example, the content (e.g., dashboard, menu, playback control, etc.) displayed on the one or more target displays can be controlled, at least partially, by an associated STB device executing a program or application that's native to the STB device or developed by a party of the developer sub-environment 150.

In some embodiments, the workflow of test scenarios is obtained in a manner independent from the program or application currently executing on the STB device(s). For example, the workflow of test scenarios can abide by black box testing principles and be manually or automatically generated without knowledge of the computer-executable code or instructions currently running on the STB device(s).

In some embodiments, each test scenario defines or otherwise indicates one or more conditions, actions, and expectations for the visual testing. Depending on the implementation, individual test scenarios can take the form of statement(s) that conforms to a defined grammar, a free-text description, a graph-based illustration, combinations of the same or the like.

In some embodiments, obtaining a workflow of test scenarios includes generating, processing, or otherwise utilizing GUI(s). In some embodiments, the GUI(s) can be generated by the visual testing server 104 and displayed via user device(s) 138, where user(s) (e.g., testers, developers, third party operators, or the like) can input one or more test scenarios.

In some embodiments, the test scenarios are connected to one another to form the test workflow. Temporally, a test scenario can be subsequent, concurrent, or partially overlapping with another. Logically, a test scenario may or may not be executed depending on the result of another test scenario in the workflow. In some embodiments, the workflow is represented as a directed graph of test scenarios that are connected with one another.

At block 304, the process 300 includes identifying one or more visual testing issues associated with executing the test scenarios of the workflow. The field testing serer 104 can communicate with the STB device(s) based on test scenario(s) retrieved from the workflow. The test scenario(s) is selected, parsed, and/or analyzed to provide condition(s) to evaluate for executing the test scenarios, action(s) to take or simulate for the testing, and/or expectation(s) of displayed content for visual verification. The visual testing server 104 can communicate with an associated server or application executing on the STB device(s) to perform or simulate action(s) (e.g., a remote control key press, menu selection, mouse click, keyboard keystroke, screen touch, idling for certain amount of time, or the like) in accordance with test scenario(s). In some embodiments, the field testing server 104 communicates or otherwise causes other device(s) (e.g., a remote control of the STB device(s), a smartphone in wireless connection with the STB device(s), a personal computer, or the like) to perform or simulate the action(s).

To identify visual testing issue(s), the field testing server 104 can obtain image(s) or video(s) that captures content displayed on the target display(s) responsive to the communication with the STB device(s) (or responsive to the action(s) otherwise performed or simulated). In some embodiments, the field testing server 104 receives the image(s) or video(s) from an associated server or application executing on the STB device(s). In some embodiments, the field testing server 104 receives or otherwise accesses such image(s) or video(s) via other device(s), such as camera(s) that capture or monitor the content presented on the target display(s).

In some embodiments, the visual testing server 104 feeds the image(s) or video(s) to trained machine learning model(s) to detect (e.g., identify, locate, and/or quantify) a set of display elements. The machine learning model(s) can include one or more convolutional neural networks, support vector machines, hierarchical statistical models, combinations of the same of the like. The machine learning model(s) can be trained on previous image(s) or video(s) that capture content presented on the target display(s). Alternatively or in addition, the machine learning model(s) can be trained on previous image(s) or video(s) that capture content presented on other display(s) controlled or associated with other STB device(s).

Depending on the training and output format of the machine learning model(s), the field testing server 104 can obtain a classification, location, size, color, and/or content of individual display elements as detected. In some embodiments, the field testing server 104 also obtains confidence value(s) (e.g., a percentage) associated with the detection of individual display elements. In some embodiments, the display element detection is performed in combination with other pattern recognition or feature detection methods (e.g., optical character recognition).

The field testing server 104 can identify visual testing issues, e.g., based at least partially on the detected display elements. The expectation(s) specified by the current test scenario can serve as a basis for the issue identification. Using the obtained properties and information regarding the detected display elements, the visual testing server 104 can perform relevant computations and compare the content displayed on the target display(s) with the expectation(s).

In some embodiments, the comparison can result in a portion of displayed the content (e.g., corresponding to detected display element(s) or lack thereof) being labeled or flagged, to indicate visual testing issue(s) and associate it with the corresponding test scenario. In some embodiments, the comparison can result in a "fail" outcome of test scenario(s), to generally signify visual testing issue(s) associated with the test scenario(s).

In some embodiments, the comparison can be indeterminate and need further investigation. For example, if the confidence value(s) associated with one or more detected display elements are below a threshold, then a user can be notified to intervene. The user can confirm whether the detected display element(s) exists, label, flag or otherwise indicate visual testing issue(s), and feedback the result to the field testing server 104, for example, via a user interface presented on an associated user device.

Figure 5:
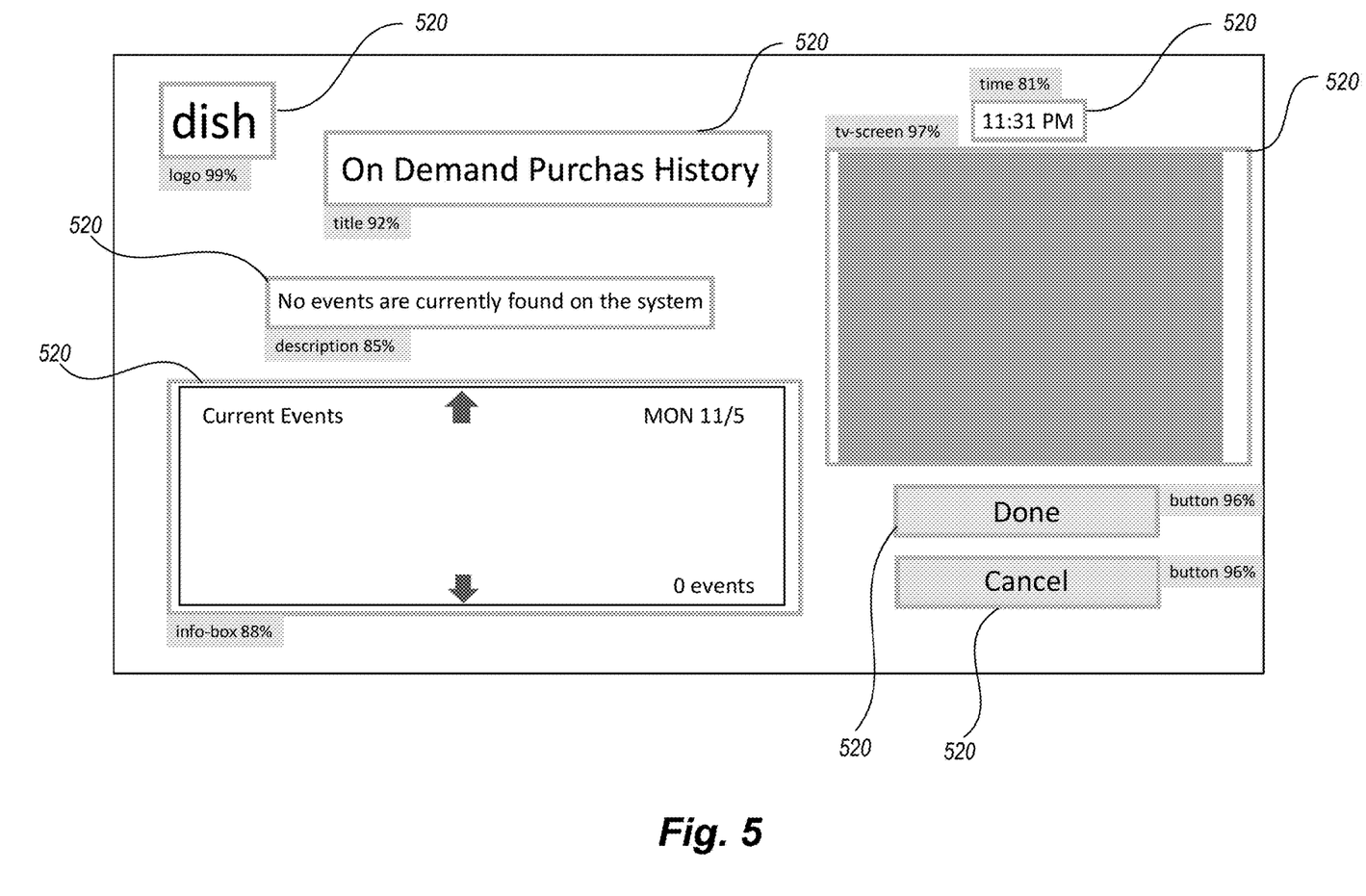
FIG. 5 shows an example of a GUI presenting the progress of test scenario execution and issue identification.

In some embodiments, the progress or result of the test scenario execution and issue identification is presented to user(s), at least partially. For example, GUI(s) can be generated by the field testing server 104 and displayed via user device(s) 138, where user(s) can monitor, intervene, or control the workflow processing, test scenario execution, or issue identification. FIG. 5 shows an example of a GUI presenting the progress of test scenario execution and issue identification. As illustrated, the GUI includes one or more bounding boxes 520 (with associated classification labels and confidence values) that highlight detected display items. Responsive to the presentation and via the GUI, user(s) can identify issue(s) associated with individual test scenarios, and label, flag, or otherwise interact with the presented elements accordingly. The indication(s) made by user(s) can be processed by the field testing server 104 and associated with the corresponding test scenario(s).

At block 306, the process 300 includes communicating the workflow and associated visual testing issue(s) for reproduction. Illustratively, the workflow and associated visual testing issue(s) are transmitted (e.g., separately or packaged in a same file) from the field testing server 104 to the developer testing server 154, where the workflow is processed and executed to reproduce the associated issue(s). In some embodiments, the associated visual testing issue(s) are presented to user(s) of the developer testing server 154 prior to processing the workflow, so that test scenarios associated with the issue(s) are sorted or selected for execution to reproduce prioritized issue(s). In some embodiments, the processing of the workflow by the developer testing server 154 includes presenting the progress or result of test scenario execution, which can be compared with the associated visual testing issue(s). The comparison can be used as a basis for determining whether the issue(s) has been properly replicated. The process 300 ends.

Figure 4:
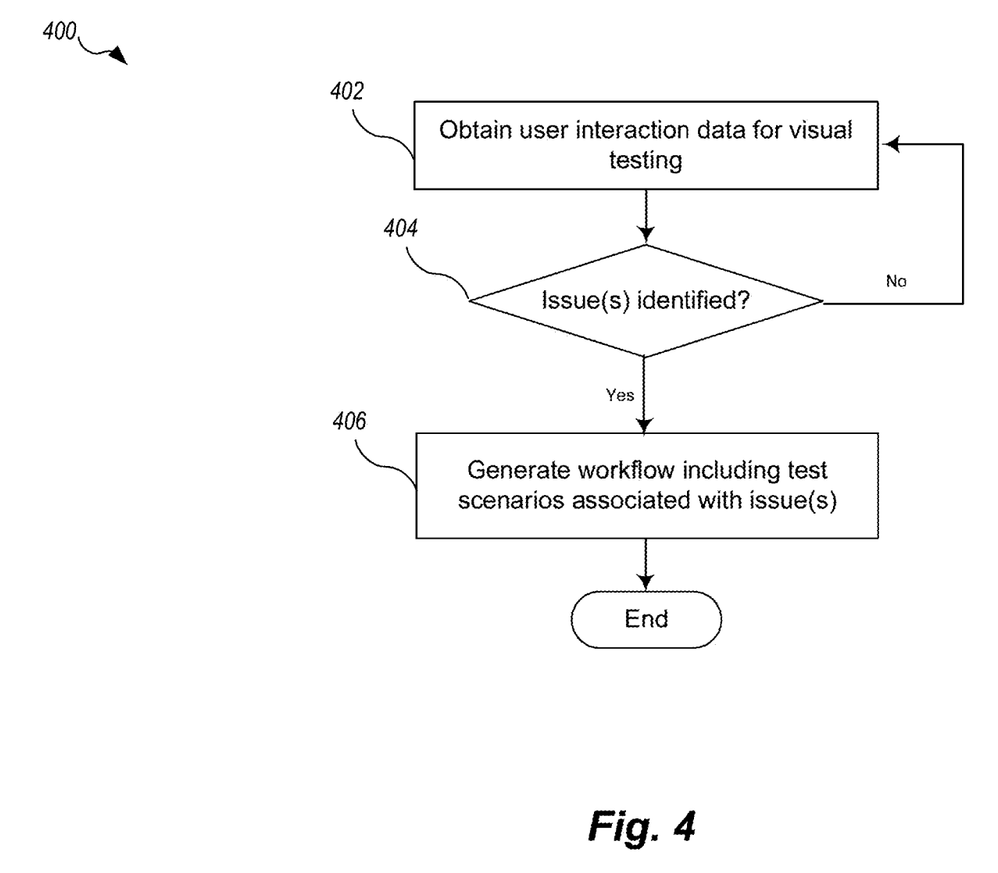
FIG. 4 is a flow diagram showing an exemplary process for generating workflow based on user interaction, according to some embodiments.

FIG. 4 is a flow diagram showing an exemplary process 400 for generating an automated workflow based on user interaction, according to some embodiments. Illustratively, the process 400 is performed by the field testing server 104. In some embodiments, part of the process 400 is performed by STB device(s) 118, user device(s) 138, or the developer testing server 154.

The process 400 begins at block 402, which includes obtaining user interaction data for visual testing. Illustratively, the field testing server 104 can monitor or record one or more users' interactions (e.g., via associated user device(s) 138) with an associated server or application executing on the STB device(s) 118. The user interactions can include a remote control key press, menu selection, mouse click, keyboard keystroke, screen touch, idling for certain amount of time, or the like. The users can perform these actions as part of a manual or semi-manual visual testing process. The field testing server 104 can monitor, record, or otherwise obtain data of content displayed on the display device(s) associated with the STB device(s) under testing. The field testing server 104 can map or convert the user interaction data (e.g., including their temporal or logical transitions, associated display content, detected display elements, or the like) into test scenarios.

At block 404, the process 400 includes determining whether visual testing issue(s) has been identified. To identify visual testing issue(s), the field testing server 104 can analyze the displayed content in response to or otherwise associated with user interactions, for example, based on the location, type, content, or confidence value of detected display element(s). In some embodiments, the analysis includes comparison with display elements detected from other, similar test scenarios. In some embodiments, the user interaction data indicates visual testing issues. For example, a user can flag, label, or otherwise indicate issue(s) via a GUI provided by the field testing server 104. The GUI can present (e.g., concurrently or when triggered by a user request) the content displayed on display device(s) associated with the STB device(s) under testing. The GUI can present display elements detected by the field testing server 104, which the user may or may not use as a basis for issue flagging or labeling.

If it is determined that visual testing issue(s) has been identified, the process 400 proceeds to block 406, which includes generating a workflow including test scenarios associated with the identified issue(s). In some embodiments, the user(s) indicates a threshold number of issue(s) or time duration for identifying the issue(s) before a workflow is generated. Illustratively, the field testing server 104 can select from the mapped or converted test scenarios to form the workflow. The selection can be based on temporal or logical connections between the test scenario(s) where issue(s) were identified and other test scenario(s). If no visual testing issue has been identified, the process 400 proceeds back to block 402.

Those skilled in the art will appreciate that the various operations depicted via FIGS. 3 and 4, as well as those described elsewhere herein, may be altered in a variety of ways. For example, the particular order of the operations may be rearranged; some operations may be performed in parallel; shown operations may be omitted, or other operations may be included; a shown operation may be divided into one or more component operations, or multiple shown operations may be combined into a single operation, etc.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. In cases where the present patent application conflicts with an application or other document incorporated herein by reference, the present application controls. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method for communicating issues of programmed display for reproduction, the method comprising:
obtaining, by a local device that at least partially controls one or more set-top box (STB) devices, a workflow for visual testing of one or more displays, wherein content displayed on the one or more displays is controlled, at least partially, by the one or more STB devices executing target instructions, wherein the workflow includes test scenarios associated with one another in a temporally partially overlapping manner and in a logically directed graph form, and wherein each of the test scenarios includes one or more logical expressions that specify one or more conditions, one or more actions, and one or more visual expectations connecting the test scenarios with one another in accordance with the directed graph form;

executing, by the local device that at least partially controls the one or more STB devices, the test scenarios;

identifying at least one visual testing issue based on the executing of the test scenarios; and communicating the workflow and the at least one visual testing issue to a remote device that is independent from the one or more STB devices, wherein the remote device performs reproduction of the visual testing issue.

2. The method of claim 1, wherein the workflow of test scenarios is generated independently from the target instructions.

3. The method of claim 1, wherein obtaining the workflow comprises generating the workflow based, at least in part, on user interactions with the one or more STB devices.

4. The method of claim 1, wherein identifying the at least one visual testing issue comprises obtaining an indication of the visual testing issue on one or more images that capture content displayed on the one or more displays.

5. The method of claim 4, wherein identifying the at least one visual testing issue is based, at least in part, on a comparison between display elements detected from the one or more images and one or more visual expectations specified by one of the test scenarios.

6. The method of claim 5, wherein the one or more visual expectations indicate at least one of a location of a display element relative to at least another display element, a location of a display element relative to the one or more displays, a range of display element location, or a distance between at least two display elements.

7. The method of claim 5, wherein the one or more visual expectations indicate at least one of a size of a display element relative to at least another display element, a size of a display element relative to the one or more displays, or a range of display element size.

8. The method of claim 1, wherein identifying the at least one visual testing issue is based, at least in part, on one or more confidence values associated with detected display elements of content displayed on the one or more displays.

9. One or more non-transitory computer-readable media collectively having contents configured to cause one or more processors to perform actions comprising:

obtaining, by a local device that at least partially controls one or more set-top box (STB) devices, a workflow for visual testing of one or more displays, wherein content displayed on the one or more displays is controlled, at least partially, by the one or more STB devices executing target instructions, wherein the workflow includes test scenarios associated with one another in a temporally partially overlapping manner and in a logically directed graph form, and wherein each of the test scenarios includes one or more logical expressions that specify one or more conditions, one or more test actions, and one or more visual expectations connecting the test scenarios with one another in accordance with the directed graph form;

executing, by the local device that at least partially controls the one or more STB devices, the test scenarios;

identifying at least one visual testing issue based on the executing of the test scenarios; and communicating the workflow and the at least one visual testing issue to a remote device that is independent from the one or more STB devices, wherein the remote device performs reproduction of the visual testing issue.

10. The non-transitory computer-readable media of claim 9, wherein the actions further comprise causing the remote device to reproduce the at least one visual testing issue based, at least in part, on the workflow.

11. The non-transitory computer-readable media of claim 9, wherein the actions further comprise converting data of user interactions with the one or more STB devices into one or more of the test scenarios.

12. The non-transitory computer-readable media of claim 9, wherein identifying the at least one visual testing issue associated with executing the test scenarios is based, at least in part, on a machine learning model.

13. The non-transitory computer-readable media of claim 12, wherein the machine learning model was trained on images that capture content displayed on one or more displays controlled, at least partially, by another STB device.

14. The non-transitory computer-readable media of claim 12, wherein the machine learning model was trained to output at least one of a classification, location, size, color, or content of display elements.

15. A system, comprising:
one or more processors; and
memory storing contents that, when executed by the one or more processors, cause the system to:
obtain, by a device that at least partially controls one or more set-top box (STB) devices, a workflow for visual testing of one or more displays, wherein content displayed on the one or more displays is controlled, at least partially, by the one or more STB devices executing target instructions, wherein the workflow includes test scenarios associated with one another in a temporally partially overlapping manner and in a logically directed graph form, and wherein each of the test scenarios includes one or more logical expressions that specify one or more conditions, one or more actions, and one or more visual expectations connecting the test scenarios with one another in accordance with the directed graph form;
execute, by the device that at least partially controls the one or more STB devices, the test scenarios;
identify at least one visual testing issue based on the executing of the test scenarios; and
communicate the workflow and the at least one visual testing issue to an other device that is independent from the one or more STB devices, wherein the other device performs reproduction of the issue.

16. The system of claim 15, wherein the contents further cause the system to obtain the workflow at least partially via a graphical user interface.

17. The system of claim 15, wherein the system includes the other device, the other device being configured to reproduce the at least one visual testing issue based, at least in part, on the workflow.

18. The system of claim 17, wherein the other device is further configured to compare the at least one visual testing issue with content displayed based, at least in part, on processing the workflow.

19. The system of claim 15, wherein obtaining the workflow comprises generating the workflow based, at least in part, on user interactions with the one or more STB devices.

20. The system of claim 19, wherein generating the workflow is further based on content displayed on the one or more displays.

* * * * *